Figure 1:
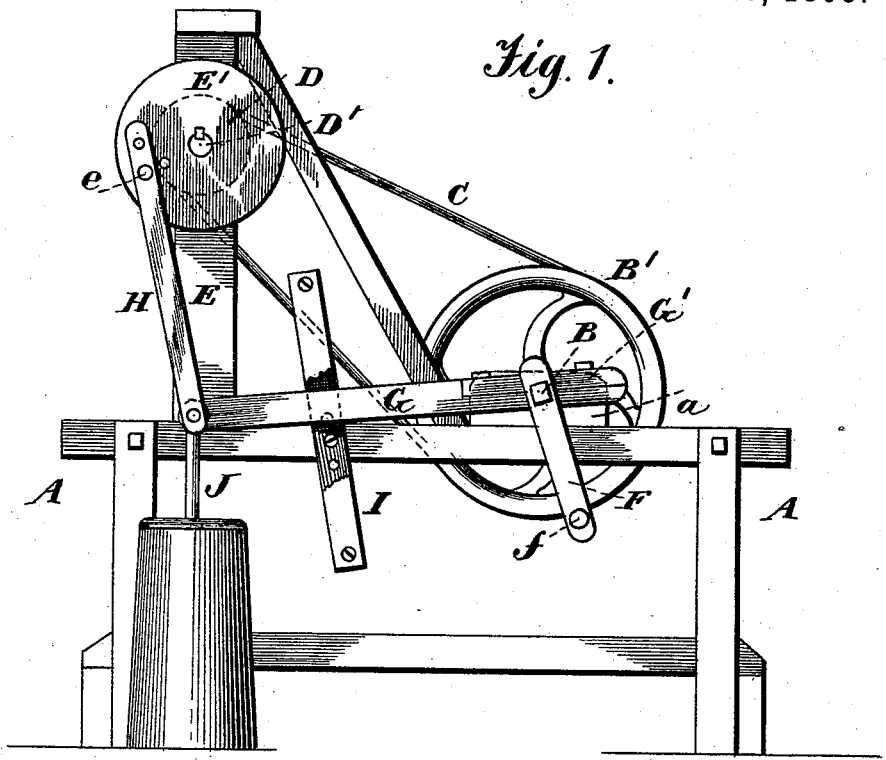

(No Model.)

H. P. McAFEE.
MOTOR.

No. 494,343.

Patented Mar. 28, 1893.

Witnesses.
A. Ruppert,
P. J. Rogers Jr.

Inventor,
Henry P. McAfee,
by Franklin H. Hough,
his Atty.

UNITED STATES PATENT OFFICE.

HENRY P. McAFEE, OF OVERTON, TEXAS.

MOTOR.

SPECIFICATION forming part of Letters Patent No. 494,343, dated March 28, 1893.

Application filed December 17, 1892. Serial No. 455,431. (No model.)

*To all whom it may concern:*

Be it known that I, HENRY P. MCAFEE, a citizen of the United States, residing at Overton, in the county of Rusk and State of Texas, have invented certain new and useful Improvements in Churn-Motors; and I do declare the following to be a full, clear, and exact description of the invention, such as will enable others skilled in the art to which it appertains to make and use the same, reference being had to the accompanying drawings, and to the letters of reference marked thereon, which form a part of this specficaition.

This invention relates to certain new and useful improvements in churn-motors, and it has for its objects among others to provide an improved churn-operating mechanism which shall be cheap and simple in its construction, easy to operate, and readily adjustable for all the purposes for which occasion may require.

Other objects and advantages of the invention will hereinafter appear and the novel features thereof will be specifically defined by the appended claim.

The novelty in the present instance resides in the peculiar combinations, and the construction, arrangement, and adaptation of parts, all as more fully hereinafter described, shown in the drawings and then particularly pointed out in the claim.

Figure 2:
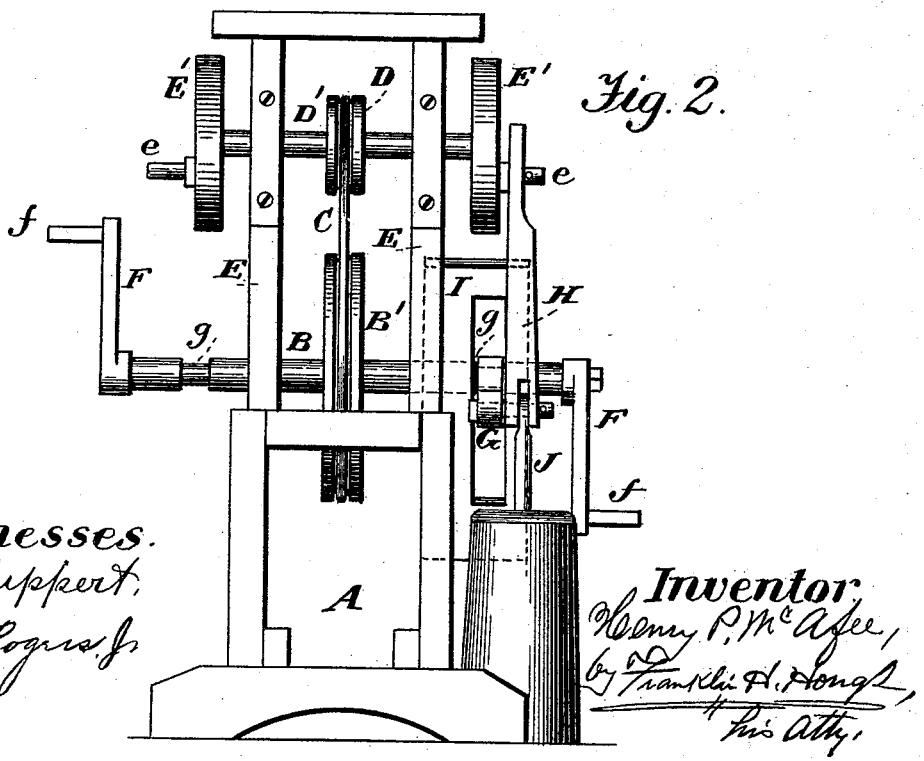

The invention is clearly illustrated in the accompanying drawings, which, with the letters of reference marked thereon, form a part of this specification, and in which Figure 1 is a side elevation of my improved churn-motor. Fig. 2 is an end elevation thereof.

Like letters of reference indicate like parts in both of the views.

Referring now to the details of the drawings by letter, A designates a suitable frame-work adapted to support the operating parts, and this frame-work may be light and if desired supported upon wheels or rollers so that it may be easily moved about from place to place.

B is a transverse shaft journaled in suitable bearings $a$ on the frame, as shown, and upon this shaft is fast a large pulley or wheel B', which is grooved around its periphery as shown to receive the endless belt or band C, which may be of any approved construction, preferably a round belt having provisions for taking up the slack when necessary. This endless belt or band passes over a smaller grooved pulley or wheel D carried by a shaft D', which is journaled in suitable bearings in the uprights E which are suitably braced as shown. This shaft has its ends extended beyond the uprights, and carries upon each end a wheel or disk E' to each of which is affixed a crank pin $e$. This crank pin may be adjustable in its crank disk, and is designed for connection with a rod or pitman which will soon be described. The wheels or pulleys and disks are keyed or secured to their shafts in any well known manner.

The shaft B is extended at each end beyond the frame-work, and has at each end a crank F with suitable handle $f$ so that it may be turned by one or two persons, as may be desired.

The shaft B has at one end, or it may be both, a circumferential groove $g$ which is engaged by one end of a horizontal swinging arm or bar G, which has its other end pivotally connected with the rod or pitman H, the upper end of which is pivotally and adjustably connected with the crank pin of the disk above described. In order to allow of ready connection of the bar G with the shaft the end of the bar is formed with a removable portion G' in which is formed one half of the bearing for the shaft, as seen best in Fig. 1. The horizontal bar G works through a suitable guide I which is adjustably connected with the frame-work as seen in Fig. 1.

J is the churn dasher stem designed to be reciprocated and to be connected with the dasher in any suitable manner; its upper end is designed to be pivotally connected with the pivot which connects the pitman with the horizontal swinging arm or bar G.

If it is desired to operate two churns at once all that is necessary to do is to provide another swinging bar on the other side and connect it with the churn dasher-stem, crank disk and shaft B in the same way.

The operation will be readily understood from the foregoing description when taken in connection with the annexed drawings, and a further description thereof is not deemed necessary. By the construction and arrangement of parts above described, and shown, I provide a churn which can be operated with ease, requiring the minimum amount of power, and one which can be operated by a child if desired.

What I claim as new is—

The combination of the frame-work, the shaft with its grooved wheel, the parallel shaft with its grooved smaller wheel, the endless belt connecting the two, the crank disk on the upper shaft, the horizontal arm, the link between the same and the crank disk, the guide for the said arms, and the dasher stem pivoted at its upper end to the pivot that connects the swinging arm and the said link, substantially as specified.

In testimony whereof I affix my signature in presence of two witnesses.

HENRY P. McAFEE.

Witnesses:
H. J. McKany,
W. B. Wherry.